United States Patent [19]
Getman

[11] Patent Number: 4,752,197
[45] Date of Patent: Jun. 21, 1988

[54] APPARATUS FOR PRODUCING FROZEN CONFECTIONS

[75] Inventor: Harlan R. Getman, Toledo, Ohio

[73] Assignee: Vroman Foods, Inc., Toledo, Ohio

[21] Appl. No.: 894,694

[22] Filed: Aug. 8, 1986

Related U.S. Application Data

[63] Continuation-in-part of Ser. No. 632,898, Jul. 20, 1984, abandoned.

[51] Int. Cl.$^4$ ............................................. B29C 47/04
[52] U.S. Cl. ..................................... 425/104; 62/345; 62/356; 62/380; 425/131.1; 425/133.1; 425/308; 425/377
[58] Field of Search .................. 425/90, 97, 104, 106, 425/131.1, 133.1, 289, 308, 456, 142, 155, 94; 62/345, 356, 380

[56] References Cited

U.S. PATENT DOCUMENTS

| | | | |
|---|---|---|---|
| 2,214,325 | 9/1940 | Gothe | 425/133.1 |
| 3,241,503 | 3/1966 | Schafer | 425/133.1 |
| 3,280,763 | 10/1966 | Komberec | 425/308 |
| 3,314,381 | 4/1967 | Fries et al. | 425/131.1 |
| 3,530,531 | 9/1970 | Posegate | 425/131.1 |
| 3,840,311 | 10/1974 | Wight | 425/131.1 |
| 4,189,289 | 2/1980 | Getman | 425/93 |

FOREIGN PATENT DOCUMENTS 524424 2/1951 Canada ........................... 425/131.1

Primary Examiner—Willard E. Hoag
Attorney, Agent, or Firm—John A. O'Toole

[57] ABSTRACT

Apparatus for producing frozen confections includes a plurality of metering pumps which equally divide a flow of semi-solid confectionary material into a like plurality of flows and delivers such flows to a like plurality of forming heads. The forming heads are reciprocated along a generally diagonal axis relative a conveyor during formation of confectionary products and in the opposite direction upon completion of formulation. The speed of translation in one direction is preferably distinct from the speed in the other direction. If desired, such flows may be combined with other unidirectionally flowing material to form a layered product. A cutting wire severs the flows of combined confection material into a desired length product in timed relation to the reciprocation of the forming heads. The individual products are received on a moving conveyor which transports them to the next operating station. Here, edible particulate material is dispensed onto the upper surface of such confections in timed relation as they each pass under the respective plurality of measuring and dispensing chutes.

13 Claims, 4 Drawing Sheets

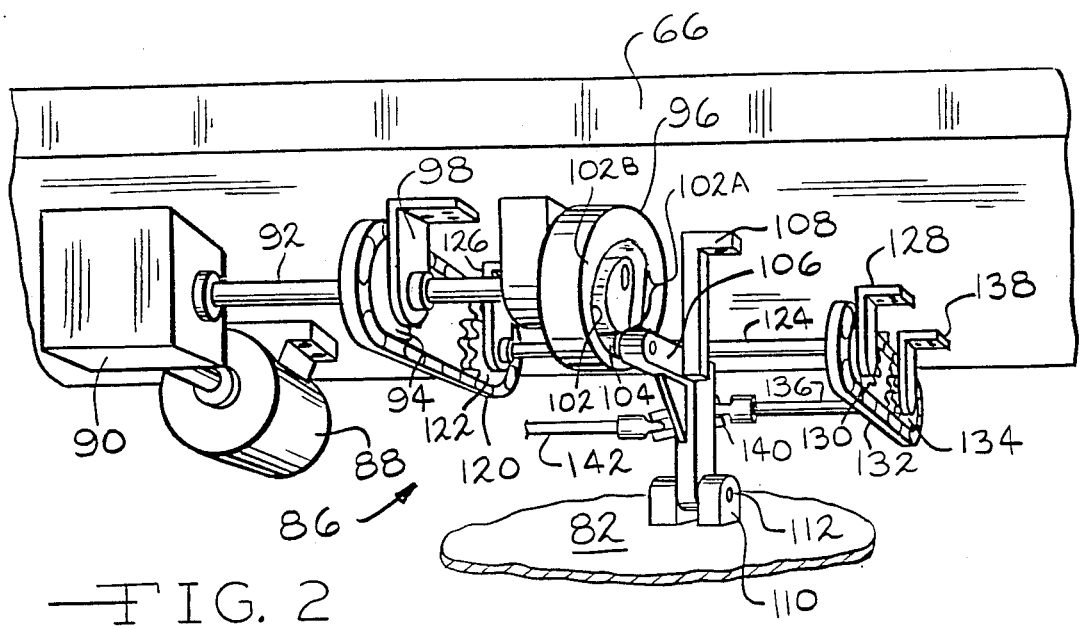
FIG. 2
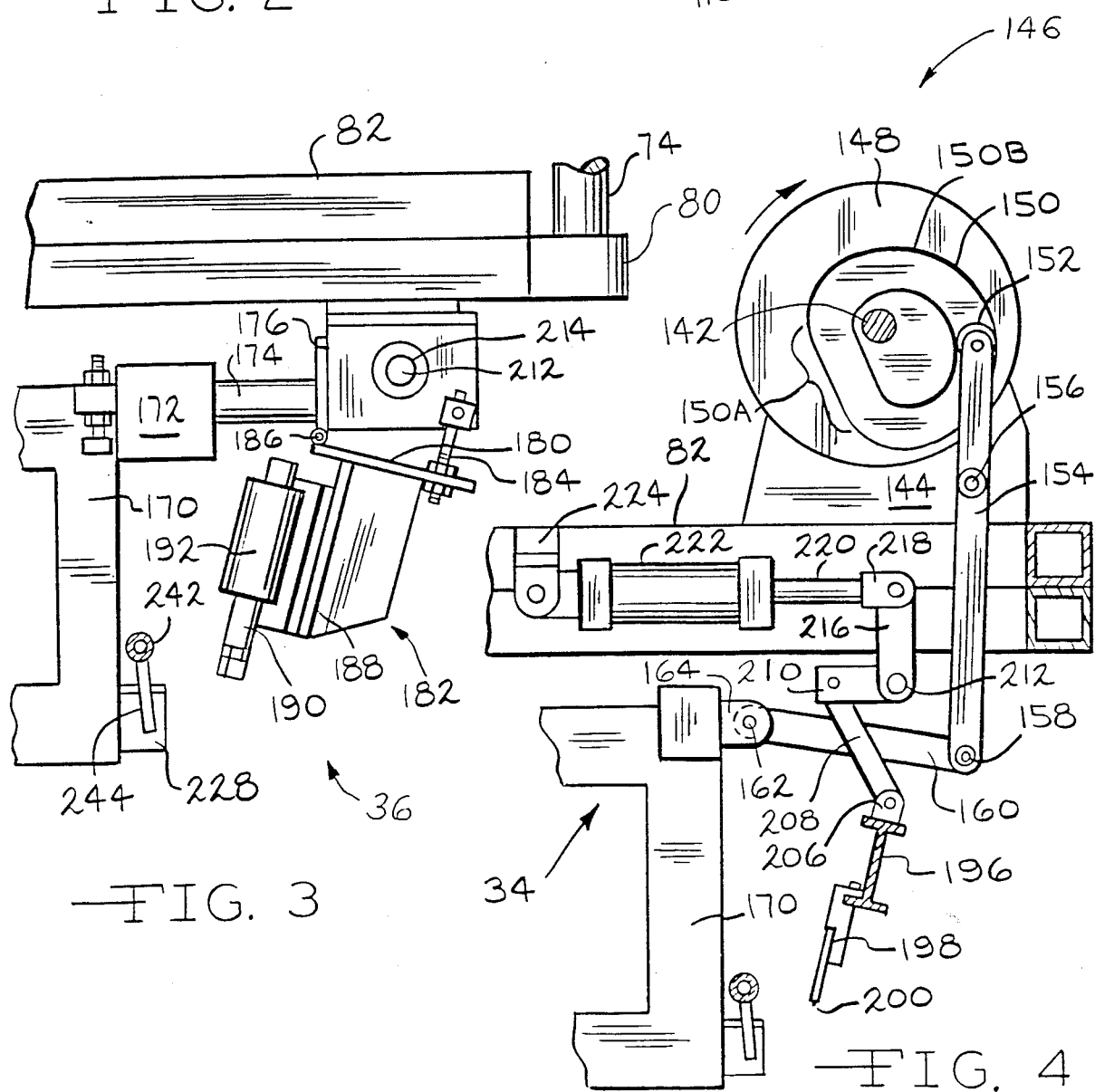
FIG. 3
FIG. 4

APPARATUS FOR PRODUCING FROZEN CONFECTIONS

CROSS REFERENCE TO RELATED APPLICATION

This patent application is a continuation-in-part of Ser. No. 632,898, filed July 20, 1984, now abandoned.

BACKGROUND OF THE INVENTION

The invention relates generally to a method and apparatus for producing frozen confections and more particularly to a method and apparatus for producing a frozen confection having edible particulate matter disposed upon a frozen confectionary base and enrobed in a coating such as chocolate.

Lines for the automated production of frozen confections take many forms and provide many and varied functions depending upon the configuration and complexity of the confection. Generally speaking, a flow of semi-frozen, viscous product such as ice cream, ice milk, or other sweetened dairy mixture is formed into an appropriate base configuration, the flow is interrupted or severed into individual product bodies and finally, particulate matter and coatings are applied. Preferably such operations are performed in a continuous manner on a machine assembly typically utilizing a conveyor for the transfer of the product in its various states from one method step performing station to another.

One such process is illustrated in my co-owned U.S. Pat. No. 4,188,768. Here, an apparatus is disclosed wherein a comestible cone receives a chocolate layer on its inner surface through an atomizing process, a dairy confection such as ice cream, ice milk, sherbert, for example, is delivered into the chocolate coated interior of the cone and edible particulate material such as chopped nuts or the like is applied to the comestible ingredient disposed within the cone. The device disclosed therein for applying the particulate material generally comprehends a metering and delivery device disposed generally above the moving conveyor and spaced several inches from the tops of the confectionary product. So disposed, a certain portion of the particulate material may not be applied to the product but may fall to the conveyor segments, slowly building up thereupon and interfering with the operation thereof. Such material represents a problem not only from a cleaning and maintenance standpoint but also from a cost standpoint as this lost material generally cannot be reused. Since such edible material is typically relatively costly, even a small percentage loss is significant.

Another, similar production line is illustrated in my co-owned U.S. Pat. No. 4,189,289. Here, frozen bodies or disks of a confection of ice cream, ice milk, or other edible material disposed on sticks are advanced through and coated in a chocolate spray. The chocolate coating is allowed to cool and congeal and is then rapidly and superficially softened by the application of heat in order to render it tacky such that edible particulate material such as chopped nuts and the like may be adhered to the surface of the chocolate coated confection. In this production line, such edible particulate matter is supplied to a chamber through which the chocolate covered confections pass and which includes a pair of rapidly spinning vanes or rotors which agitate and propel the particulate material randomly about the chamber at sufficient velocities that impact with the chocolate coating secures them thereto. Since the chamber necessarily includes entrance and exit openings for the confections, a certain portion of the randomly propelled particulate material will escape from the chamber without adhering to the confections. While such particulate material can generally be recovered and resupplied to the chamber, if desired, it represents a process the efficiency and efficacy of which can be improved.

SUMMARY OF THE INVENTION

The instant invention is directed to a method of and apparatus for producing frozen confections consisting of a base of ice cream, ice milk or other edible material combined with at least one layer of a distinct material such as caramel, edible particulate matter such as nuts disposed on the upper surface thereof and a coating of a third distinct confection such as chocolate which enrobes the other constituents. The apparatus includes a plurality of metering pumps which may be independently adjusted to provide a like plurality of equal flows of a semi-solid confectionary material such as ice cream, ice milk or the like. Such flows are delivered to a like plurality of dispensing heads or dies where this material may be combined with at least one other material such as caramel or the like to form a layered product. The dispensing heads are secured to a platform which simultaneously reciprocates along vertical and horizontal axes to move the dispensing heads in a generally diagonal pattern facilitating product formation and severing. The individual bodies are severed by a cutting wire which reciprocates in timed relation to the motion of the platform and dispensing heads. Preferably, the dispensing heads are aligned such that a common cutting wire may simultaneously sever the plurality of flows of the combined confectionary materials into individual bodies of a desired length.

The individual bodies are received on a moving conveyor which transports them to the next station of the apparatus where they receive edible particulate material on their upper surfaces. This station includes a supply hopper for such particulate material which feeds into a plurality of delivery channels and chutes which are mechanically vibrated in timed relationship to the passage of the bodies beneath the chutes. Accurate measurement and uniform dispersion of the edible particulate material on the upper surface of the confectionary bodies is thus achieved.

The confectionary bodies then pass through a refrigeration zone where they are frozen before receiving a coating of chocolate or similar material from a final operating station. The coated and frozen confectionary bodies may then be provided to a packaging area where they are suitably packaged.

Thus it is an object of the instant invention to provide a method for producing frozen confectionary bodies consisting of a base portion and one or more layers of diverse constituents, edible particulate matter disposed thereupon and a coating surrounding such base portion, layers and particulate matter.

It is a further object of the instant invention to provide an apparatus for producing frozen confectionary bodies having a base and layers, particulate matter disposed thereupon and a coating surrounding such base, layers and particulate matter.

It is a still further object of the instant invention to provide an apparatus for the production of frozen confectionary bodies having an assembly for applying edible particulate matter which accurately and repeatedly measures the quantity of particulate matter applied.

It is a still further object of the instant invention to provide an apparatus for the production of frozen confectionary bodies having an assembly for applying particulate matter which substantially eliminates waste of such particulate matter.

Further objects and advantages of the instant invention will become apparent by reference to the following description of the preferred embodiment and appended drawings.

BRIEF DESCRIPTION OF THE DRAWINGS

FIG. 2 is a fragmentary, perspective view of a portion of the drive means of an apparatus for producing confectionary bodies according to the present invention;

FIG. 3 is a fragmentary, side elevational view of a portion of the platform, carriage, and cutting wire assemblies of an apparatus for producing confectionary bodies according to the present invention;

FIG. 4 is a fragmentary, side elevational view in partial section of the drive mechanisms for the carriage and cutting wire assemblies;

DESCRIPTION OF THE PREFERRED EMBODIMENTS

Figure 1:
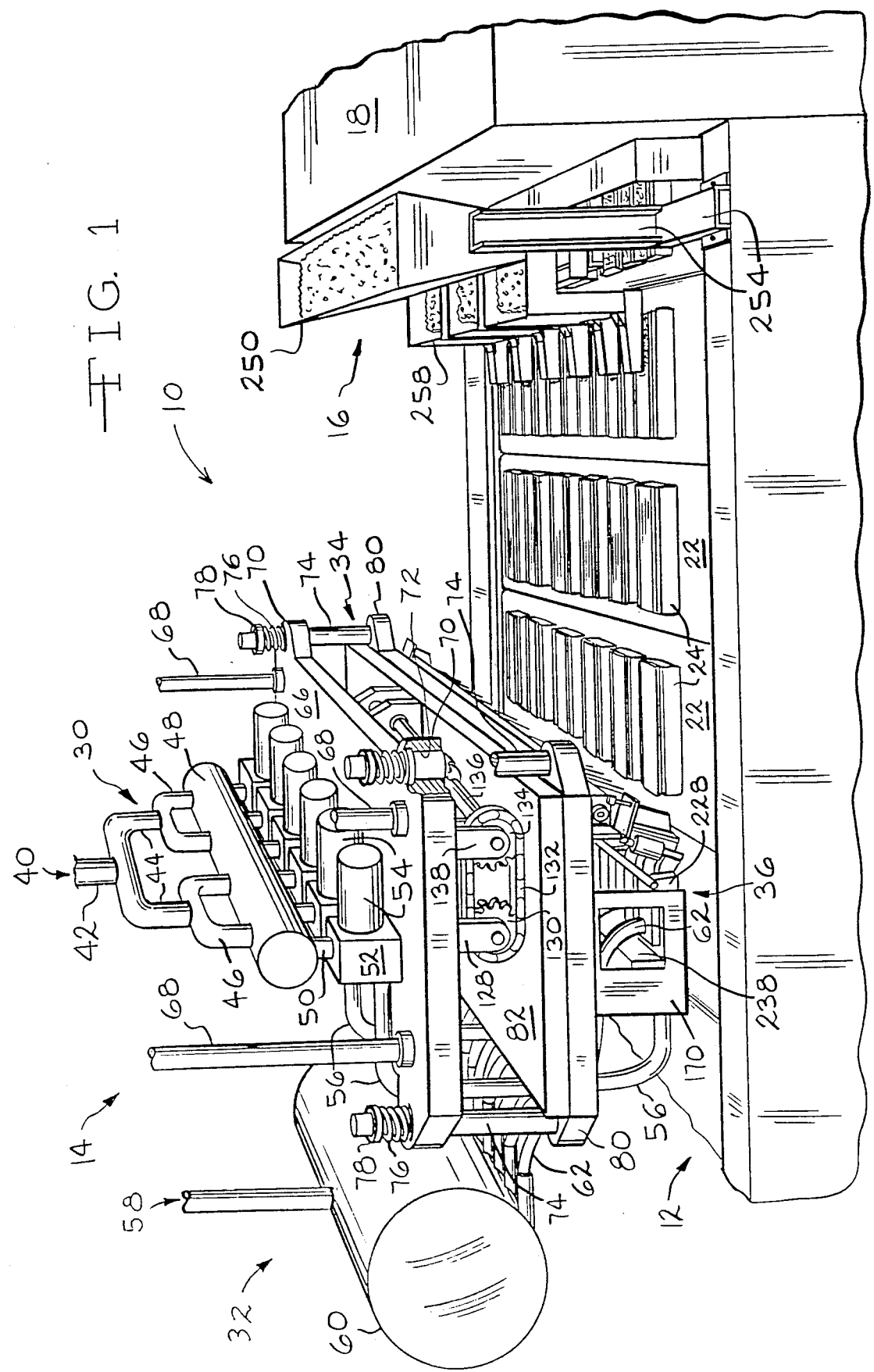
FIG. 1 is a perspective view of an apparatus for producing confectionary bodies according to the present invention.
Figure 5:
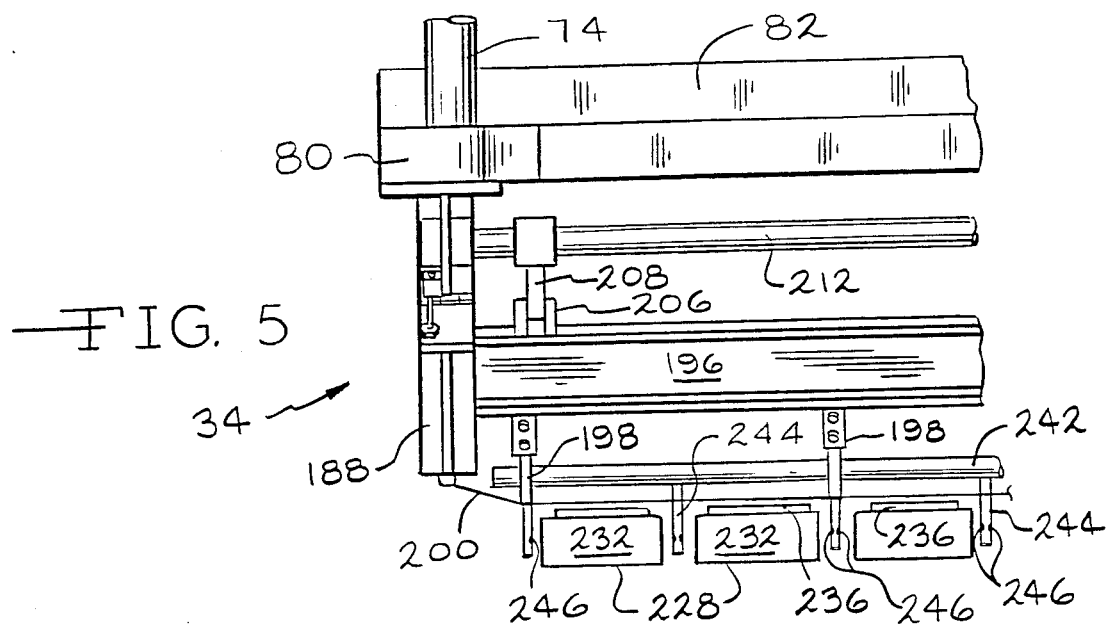
FIG. 5 is a fragmentary, end elevational view of a portion of the platform, carriage, cutting wire assemblies, and forming heads.
Figure 6:
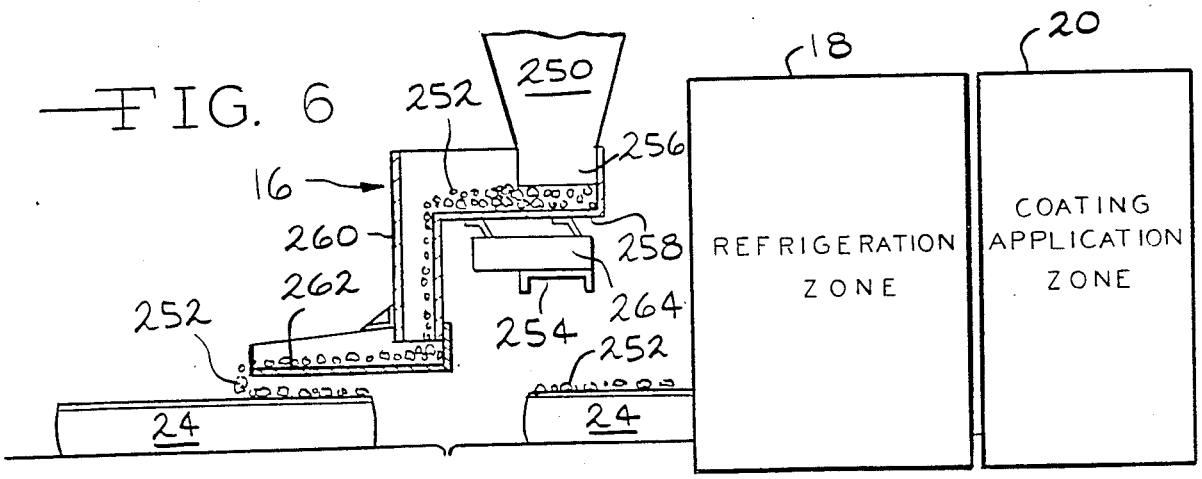
FIG. 6 is a fragmentary side elevational view of one of the particulate material dispensing assemblies and associated processing zones.

Referring now to FIG. 1, an apparatus for the production of confections including edible particulate matter according to the instant invention is illustrated and generally designated by the reference numeral 10. The apparatus 10 generally includes a conveyor assembly 12, a confectionary body forming assembly 14, and a particulate material application assembly 16. In FIG. 6, a refrigeration zone 18 and a coating application zone 20 are illustrated which also are a part of the apparatus 10. The conveyor assembly 12 is conventional and may include a plurality of transversely extending segments 22 having lengths approximately equal to or slightly longer than the length of confectionary bodies 24 formed by and in accordance with the instant apparatus and method. The conveyor assembly 12 may, alternatively, include a continuous full width belt. It is preferably driven through a speed reducing drive by an electric motor (both not illustrated) and in FIG. 1, moves from left to right.

The confectionary body forming assembly 14 includes several subassemblies such as a first confection supply assembly 30, a second confectionary supply assembly 32, a platform and carriage assembly 34 and a forming and severing assembly 36.

Turning first to the first confectionary supply assembly 30, it receives a flow of viscous, typically semi-frozen dairy product such as ice cream, ice milk, or the like, or similar flowable confection or material 40 through a conduit 42. The conduit 42 bifurcates into a pair of conduits 44, each of the conduits 44 again bifurcating into a set of four conduits 46. Each of the four conduits 46 feeds into a common, elongate manifold 48. This arrangement of serially bifurcating conduits provides a highly uniform distribution of the flow of the material 40 to the elongate manifold 48 thereby facilitating uniform volumetric flow out of the manifold 48 as will next be described.

A plurality of outlet conduits 50 communicates between the manifold 48 and a like plurality of constant displacement pumps 52 such as gear pumps or similar constant displacement design which are driven by a like number of individual variable speed motors 54. Each of the variable speed motors 54 may include a speed reduction drive (not illustrated) between it and the associated constant displacement pump 52. Each of the motors 54 is preferably provided with electrical power controlled by a device such as an SCR or triac controller (not illustrated) which permits accurate and infinitely adjustable control of the rotational speed of the motor 54 and pump 52 and thus the output flow thereof. From each of the constant displacement pumps 52, a flexible hose 56 carries the confectionary material 40 from the first confectionary supply assembly 30 to the forming and severing assembly 36. It should be understood that the precise number of bifurcations in the fluid supplied to the manifold 48 as well as the number of conduits 48, pumps 52, and flexible outlet hoses 56 may and will be adjusted to suit individual circumstances and desired production capacity. The utilization of six constant displacement pumps 52 and the associated components of FIG. 1 should therefore be considered merely illustrative and exemplary. The precise number of such components actually utilized may vary significantly and no limitation on the present invention should be inferred.

The confectionary body forming assembly 14 further includes a second confectionary supply assembly 32 which receives a flow of a second confectionary material 58 such as caramel, marshmallow, or similar confectionary material which is distinct from the first confectionary material 40. The second confectionary supply assembly 32 includes a pressurized tank or header 60 having a plurality of flexible outlet hoses 62 which distribute and transfer the flow of the second confectionary material 58 to the forming and severing assembly 36.

Referring to FIGS. 1 and 2, the confectionary body forming assembly 14 also includes a generally rectangular base 66 which is suspended from above by structural members such as a plurality of columns 68. The columns 68 may be secured to building super-structure (not illustrated) or may be secured to an overhead horizontal and/or vertical crane mechanism whereby the entire confectionary body forming assembly 14 may be raised, lowered, and horizontally translated as desired. The base 66 is stationary during operation of the apparatus 10 and provides a stationary plane of securement for the plurality of constant displacement pumps 52 and associated electric motors 54. A plurality of lugs or ears 70, preferably four in number, are disposed generally adjacent each corner of the base 66 and define a vertically oriented aperture or bushing 72 which each receives a vertically oriented guide bar or rod 74. A compression spring 76 is concentrically disposed about the upper portion of each of the guide rods 74 and engages the upper surface of the lugs 70. An annular retaining collar 78 surrounds and is secured to each of the rods 74 and engages the end of the compression spring 76 opposite the lug 70, thereby providing a spring biased downward limit to the travel of the guide rods 74 as will be readily understood. Each of the lower termini of the guide rods 74 is secured to a lug or ear 80 which extends from the periphery of a platform 82.

The platform 82 is a component of the platform and carriage assembly 34 and is reciprocated vertically by a vertical reciprocation mechanism 86 secured to the underside of the base 66. The vertical reciprocation mechanism 86 includes a prime mover such as an electric motor 88 which is coupled to a speed reducing and affixed to the shaft 124 and engages a second chain 132 which transfers rotational energy laterally to a fourth chain sprocket 134. The fourth chain sprocket 134 is likewise secured to a first stub shaft 136 which is supported in another bushing and bracket assembly 138 secured to the underside of the base 66. The first stub shaft 136 is terminated in a double universal joint 140 which permits misalignment and angular flexibility between the stub shaft 136 and a second stub shaft 142 secured to the opposite end of the double universal joint 140.

Referring now to FIGS. 1, 2, and 4, the second stub shaft 142 is supported between a pair of brackets 144 (one of which is illustrated in FIG. 4) which are secured to the platform 82 and form a portion of the horizontal reciprocation mechanism 146. Secured to the second stub shaft 142 is a horizontal drive cam 148 having a track 150. The profile of the cam track 150 is substantially similar to the profile of the track 102 of the vertical drive cam 96 in that it provides relatively rapid radial motion of a follower over a short portion of the cam track designated 150A and relatively slow return motion over a significantly greater portion of the cam track designated 150B. Disposed within the track 150 of the horizontal drive cam 148 is a roller-type cam follower 152 which is secured to a crank 154. The crank 154 is pivotally secured by means of a pivot pin 156 or other suitable means to a pair of brackets 144. At the opposite end of the crank 154 is disposed a pin 158 which pivotally secures the crank 154 to a linkage arm mechanisms 184 permit adjustment of the return or home position of the cutting wire assembly 182 about the axis of a pair of pins 186 of the hinges 180. Thus the cutting wire assembly 182 may be pivoted somewhat closer to or further away from the carriage 170 from the position illustrated in FIG. 3 by releasing and resecuring the threaded adjustment mechanism 184. The cutting wire assembly 182 includes a pair of brackets 188 which are secured to and each support a tubular guide 190. Slidably disposed about each of the tubular guides 190 is a C-shaped cylindrical guide 192. The cylindrical guides 192 substantially surround the tubular guides 190 and the pairs of members cooperatively define sliding bushings which facilitates bi-directional translation of the cylindrical guides 192 along the axes established by the tubular guides 190.

Extending between the pair of cylindrical guides 192 disposed on opposite sides of the platform 82 is an I-beam 196. Secured at intervals across the I-beam 196 are a plurality of stanchions 198 which receive and support a cutting wire 200. The cutting wire 200 is tautly stretched between such stanchions 148 and is secured at each end by a suitable fastening means such as a clamp or a threaded fastener (not illustrated). Secured to the upper portion of the I-beam 196 at at least two positions along its length is a clevis 206 which pivotally receives a link 208. At least two links 208 are preferably utilized and each of the links 208 is pivotally secured to a respective arm of a respective pair of crank arms 210. The crank arms 210 are fixedly secured to a shaft 212 which extends substantially across the full width of the platform 82 and is received within bushings 214 in the mounting blocks 176. Fixedly secured to the shaft 212 at preferably approximately its transverse midpoint is a crank arm 216. The crank arm 216 is in turn pivotally secured to a clevis 218 affixed to the terminus of a piston rod 220. The piston rod 220 is received within a cylinder 222. The cylinder 222 is preferably pivotally secured by a clevis 224 or other suitable assembly to the underside of the platform 82. The cylinder 222 preferably includes a spring (not illustrated) which biases the piston rod 220 to the extended position illustrated in FIG. 4. When compressed air or hydraulic fluid is applied to the cylinder 222, the piston rod 220 retracts, overcoming the bias of the spring and driving the I-beam 196 and specifically the cutting wire 200 downwardly. Upon release of such fluid pressure, the piston rod 220 extends and returns to the position illustrated in FIG. 4. This function may also be achieved by utilization of a double-acting piston and cylinder by alternately charging and venting opposite ends of the cylinder as those familiar with such components will readily understand. Control of the supply and release of fluid pressure to the cylinder 222 may be achieved by a conventional electro-pneumatic valve (not illustrated). Actuation of such valve occurs once for every rotation of the shafts 92, 124, 136, and 142 or the cams 96 and 148 which may be sensed by any conventional optical, electrical, magnetic or mechanical sensor (not illustrated).

Referring to FIGS. 1, 3, 5, and 8, the means for forming the individual confectionary bodies 24 will now be described. Across the width of the conveyor 22 are disposed a plurality of forming heads 228. The forming heads 228 are disposed in parallel, juxtaposed relationship and define an output axis generally parallel and aligned with the direction of travel of the conveyor assembly 12. Each of the forming heads 228 is generally rectangular in cross section and includes a pair of inlets for the first and second flows of confectionary material 40 and 58, respectively. A first inlet 230 associated with each of the flexible hoses 52 communicates with a larger bottom region 232 of the forming head 228 and a second inlet 234, associated with each of the flexible hoses 62 communicates with a thin, generally rectangular upper region 236. It should be understood that the relative sizes, shapes, orientations and number of regions in the forming heads 228 may be varied widely to produce a given size and configuration of product. It will also be appreciated that the plurality of forming heads 228 are equal in number to the number of constant displacement pumps 52 and motors 54 inasmuch as the larger center region 232 of each of the forming heads 228 is associated with and fed by one of the pairs of pumps 52 and motors 54. It should further be appreciated that each of the forming heads 228 are identical though, of course, this need not be so.

The plurality of forming heads 228 are each secured to a common support beam 238 which forms a portion of and extends across the full width of the carriage 170. Also extending substantially across the full width of the carriage 170 is a header 242. The header 242 is hollow and communicates with a plurality of depending hollow tubes 244 having closed ends. One of the hollow tubes 244 is disposed adjacent each vertical sidewall of the forming heads 228, generally adjacent its output end as illustrated in FIG. 3. The hollow tubes 244 include ports 246, one of which is aimed and aligned with the vertical wall of the adjacent forming head 228. Thus, the hollow tubes 246 on the extreme ends of the header 242 include but one port 246 whereas the remaining hollow tubes 244 disposed intermediate adjacent forming heads 228 include two ports 246, one directed to each of the adjacent sidewalls of the forming heads 228. The header 242 is supplied with compressed air at low pressure and the hollow tubes 244 provide a jet of air directed to the vertical sidewall of the forming head 228 generally adjacent its outlet, thereby providing a flow of warming and drying air which inhibits the formation of condensation and ice which might interfere with the formation of the confectionary bodies 24.

Referring now to FIGS. 1 and 6, the particulate material application assembly 16 is disposed generally transversely to and extends across the full width of the conveyor assembly 12. The particulate material application assembly 16 preferably includes a storage chamber or hopper 250 having a volume sufficient to supply edible particulate material 252 such as chopped nuts and the like for an extended period of time. When empty, or substantially so, the hopper 250 may be filled manually from bulk supplies of the particulate matter 252 maintained nearby. The hopper 250 is supported by suitable brackets or supports 254 which are in turn secured to stationary frame members of the conveyor assembly 12. The hopper 250 is generally trapezoidal in cross section and tapers to a relatively narrow outlet section 256 which feeds into a plurality of chambers 258 which each extend transversely across a portion of the width of the conveyor assembly 12. The outlet section 256 of the hopper 250 extends to within a short distance of the bottom surface of the chambers 258. The vertical spacing between the lowermost portion of the outlet section 256 and the bottom of the chambers 258 is such that the particulate material 252 may not readily flow out of the section 256 but is sufficiently great and preferably only slightly greater than the maximum dimension of any particulate material 252 such that particles cannot be trapped therebetween. Conversely, the spacing is not so great that particulate material 252 is permitted to flow unrestrained from the hopper 250 into the chambers 258. The chambers 258 are divided into a plurality of vertically oriented chutes 260 which terminate in a like plurality of horizontal troughs 262 disposed just slightly above the upper surfaces of the confectionary bodies 24. The entire assembly of the hopper 250, chambers 258, chutes 260 and troughs 262 are disposed upon a plurality of mechanical vibrators 264. Preferably, the mechanical vibrators 264 are electrically powered and may thus be readily and intermittently activated in timed relationship to the passage of confectionary bodies 24 below the termini of the horizontal troughs 262. The mechanical vibrators 264 are preferably secured to and supported by a structure such as the brackets 254. The quantity of particulate material 252 applied to the confectionary bodies 24 as they pass below the end of the horizontal trough 262 may be controlled by either adjusting the vertical separation between the bottom of the outlet section 256 and the chamber 258 or by adjusting the intensity of the vibration generated by the mechanical vibrators 264. It should be appreciated that the particulate material application system 16 is capable of accurate and repeated measurement of particulate material 252 and application thereof to confectionary bodies 24 passing thereunder.

Referring now to FIGS. 1 and 6, there are illustrated the refrigeration zone 18 and a coating application zone 20. The refrigeration zone 18 may be any conventional sub-zero cooler through which the confectionary bodies 24 pass on the conveyor segments 22 and in which they enjoy a residence time of approximately 15 to 30 minutes. Here they are rapidly and uniformly chilled to a reduced temperature, typically substantially below 0° F. The confectionary bodies 24 are then translated by the conveyor assembly 12 to a coating application zone 20. Here, coatings such as chocolate or a similar confectionary material are applied to the exterior surfaces of the confectionary bodies 24. The coating may be applied by spraying, dipping, or other suitable processes known in the art. If the coating material is chocolate or a material which displays similar temperature related viscosity characteristics, the previous refrigeration step ensures that the coating will adhere readily to the individual confectionary bodies 24 and congeal rapidly due to the significantly reduced temperature of the bodies 24.

Referring now generally to FIGS. 1 through 7 and particularly to FIGS. 9 through 12, the method of producing frozen confections with the above-disclosed apparatus will now be described. As noted previously, a flow of first confectionary material 40 such as ice cream, ice milk or the like is received by the first confectionary supply assembly 30. Bifurcating conduits 44 and 46 provide a uniform flow of the confectionary material 40 into the manifold 48. The constant displacement pumps 52 which are individually driven by variable speed motors 54 provide individually controlled flows of the first confectionary material 40 through the flexible outlet hoses 56 to the larger, bottom regions 232 of the forming heads 228. It will be appreciated that the foregoing configuration permits individual adjustment of the volume rate of the flow of the confectionary material 40 in order to ensure, through adjustment, identical flows of the confectionary material 40 to each of the forming heads 228 and thus identical weight bodies 24. Likewise, the second confectionary supply assembly 32 receives a flow of a second confectionary material 54 such as caramel, marshmallow, or a material which is distinct from the first confectionary material 40. This material 54 is received within a pressurized tank or header 60 and, due to its viscosity relative to the first confectionary material 40, is relatively readily divided into a plurality of flows through the flexible hoses 62 which transfer the second confectionary material 54 to the second inlet 234 of the forming heads 228 and into the generally rectangular upper region 236 thereof. As provided to the forming heads 228, the flows of the first confectionary material 40 and the second confectionary material 58 are continuous.

Figure 7:
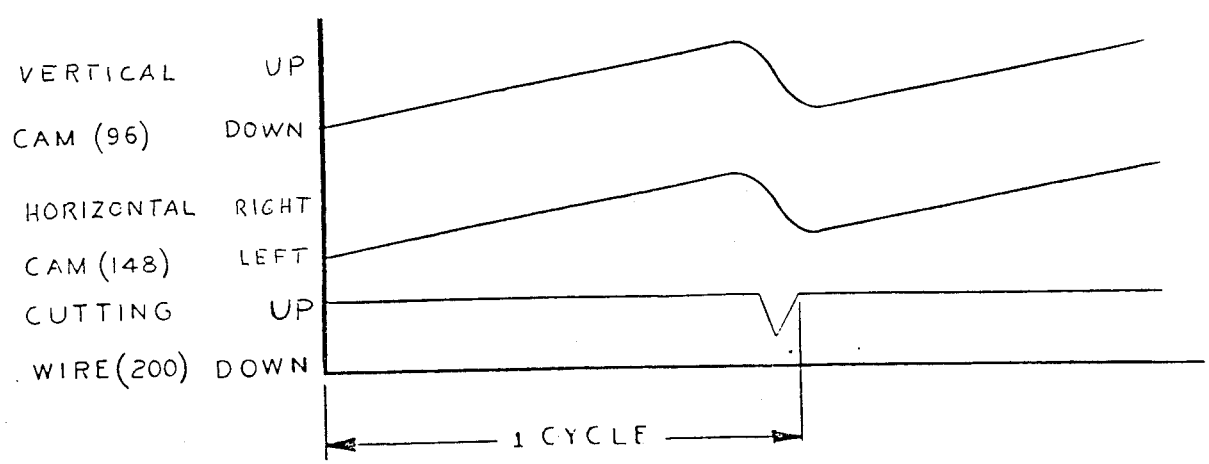
FIG. 7 is a graphic presentation of the relationships between the positions of the vertical platform and cam, the horizontal carriage and cam and the cutting wire.
Figure 8:
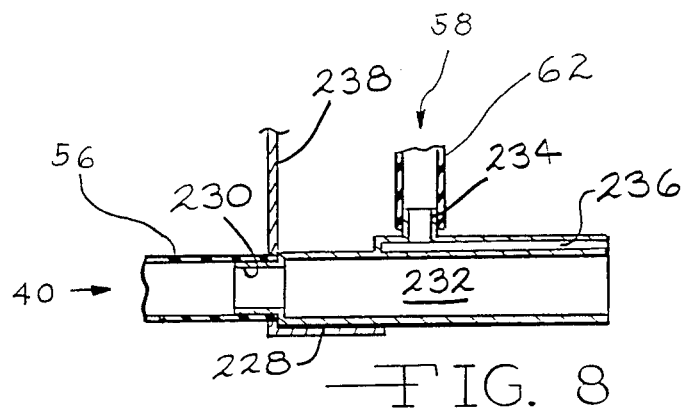
FIG. 8 is a side elevational view in full section of a confectionary forming head.

Turning now to the platform and carriage assembly 34 and specifically the vertical reciprocation mechanism 86 and the horizontal reciprocation mechanism 146, the operation of these elements is best illustrated with reference to FIG. 7. The cams 102 and 148, as noted previously, are directly coupled such that they rotate constantly at the same speed and thus with the same phase relationship. Furthermore, the profiles of the tracks 102 and 150 are substantially identical in that they provide rapid motion during travel of the device coupled thereto in one direction of the reciprocating cycle and slow motion in the opposite direction of the reciprocating cycle. Specifically, the profile of the track 102 of the cam 96 of the vertical reciprocation mechanism 86 is arranged such that the associated platform 82 ascends slowly and descends relatively rapidly as graphically illustrated in FIG. 7. Likewise, and in the simultaneous timed relationship therewith, the horizontal cam 148 and the track 150 thereof drive the carriage 170 slowly to the right in FIGS. 1, 3 and 4, during one portion of the reciprocating cycle and rapidly to the left during the other portion of the reciprocating cycle and cam profile designated 150A. The slow and rapid motions of the platform 82 and the carriage 170 are provided in unison as illustrated in FIG. 7. Thus, the movement of the carriage 170 and specifically the forming heads 228 define a generally diagonal line extending relatively from the lower left position to an upper right position, as generally illustrated in FIGS. 9 through 12. Furthermore, the horizontal motion of the carriage 170 and the forming heads 228, that is, that motion provided by the horizontal reciprocation mechanism 146, when moving from left to right during the portion 150B of the track 150, is slightly faster than the horizonal linear speed of the conveyor assembly 12.

Figure 9:
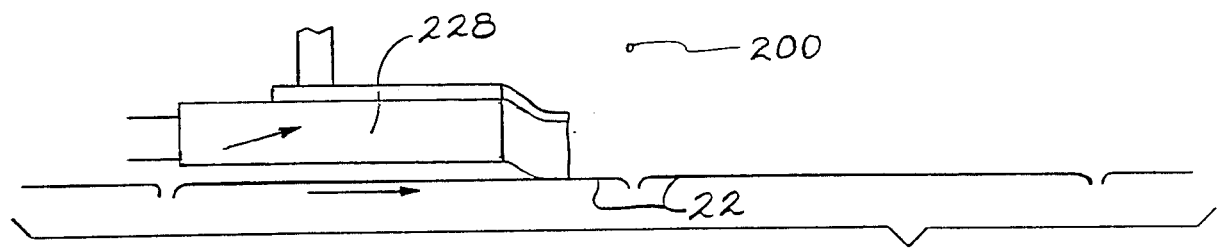
FIG. 9 is a diagrammatic view of a forming head and conveyor during the early portion of the confectionary body forming cycle.
Figure 10:
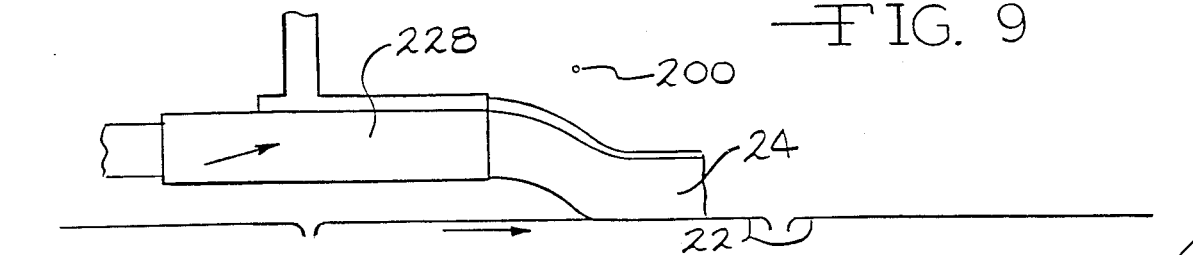
FIG. 10 is a diagrammatic view of a forming head and conveyor during an intermediate portion of the confectionary body forming cycle.
Figure 11:
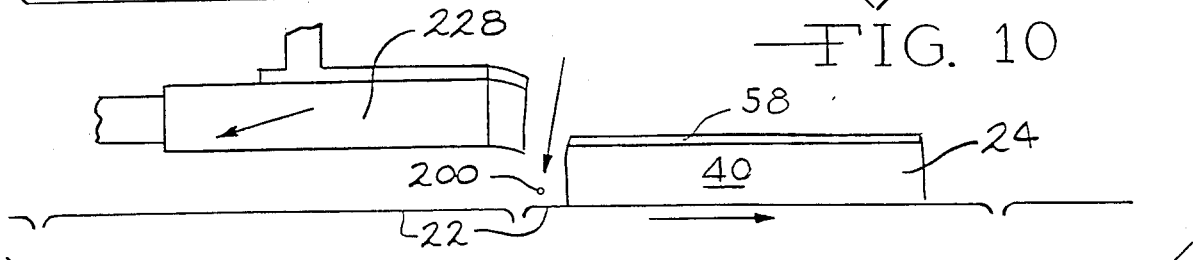
FIG. 11 is a diagrammatic view of a forming head and conveyor at approximately the end of the confectionary body forming cycle wherein a confectionary body has been fully formed and just severed from the flow of confectionary material issuing from the forming head.
Figure 12:
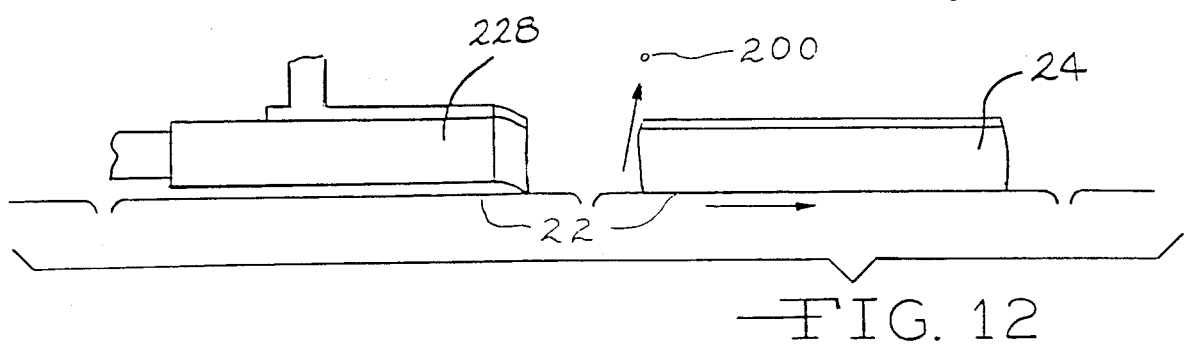
FIG. 12 is a diagrammatic view of a forming head and conveyor at the end of one forming cycle and the beginning of the subsequent forming cycle of a confectionary body.

The forming and severing of the confectionary bodies 24 will now be described with reference to FIGS. 9 through 12. FIG. 9 illustrates the position of the forming head at an instant early in the forming step of the confectionary body 24. The forming head 228 is moving to the right in the same direction as the conveyor segments 22, though at a slower speed and upwardly as well. FIG. 10 illustrates the formation of a confectionary body 24 at approximately the midpoint of production of a given confectionary body 24. Note that the forming head 228 has moved upwardly and to the right from the position illustrated in FIG. 9 relative to the cutting wire 200. In FIG. 11, the forming head 228 has completed a forming cycle and is beginning to move rapidly to the left and downwardly while the cutting wire 200 cycles rapidly downwardly to sever the flow of confectionary materials 40 and 58 issuing from the open end of the forming head 228. The completed confectionary body 24 is thus produced comprising a lower base portion of a first confectionary material 40 and an upper topping portion of a second confectionary material 58, and positioned substantially in the center of the segment 22 of the conveyor assembly 12 adjacent the open end of the forming head 228. In FIG. 12, the forming head 228 is disposed at its lowermost and leftmost position and the flow of confectionary material 24 continues to issue from the forming head 228, commencing formation of the next confectionary body 24. The cycle then repeats as illustrated by the next step illustrated in FIG. 9 as the forming head begins to move upwardly and to the right, repeating the cycle.

What is claimed is:

1. An apparatus for producing confections comprising, in combination:
    means for providing a first flow of a first confectionary material,
    means for providing a second flow of a second confectionary material,
    nozzle means for combining and extruding said flows of confectionary material into a unitary flow,
    means for reciprocating said nozzle means along a first axis;
    means for severing said unitary flow into individual bodies,
    conveyor means, for translating said individual bodies, movable along a second axis at a small acute angle to said first axis, and
    means for providing a measured amount of edible particulate material on each of such individual bodies.

2. The apparatus of claim 1 wherein said means for providing a first flow of a first confectionary material includes a variable flow rate pump.

3. The apparatus of claim 1 wherein said means for severing said shaped flow includes a reciprocating cutting structure.

4. The apparatus of claim 1 wherein said means for providing particulate material includes an open ended channel means for receiving said particulate material and means for vibrating said channel means.

5. The apparatus of claim 1 wherein said nozzle means includes first and second juxtaposed chambers for receiving a respective one of said flows of confectionary material, said chambers having a respective pair of adjacent outlets.

6. An apparatus for producing frozen confections, comprising, in combination:
    means for providing a plurality of substantially uniform flows of a first confectionary material,
    means for providing a like plurality of substantially uniform flows of a second confectionary material,
    a respective plurality of open-ended chamber means each defining having a first passageway of substantially constant cross section for receiving a respective one of said flows of a first confectionary material and a second passageway of substantially constant cross section for receiving a respective one of said flows of a second confectionary material and discharging such flows in a common flow,
    means for reciprocating said chamber means along a first axis
    means for severing said common flows of confectionary material into individual bodies,
    conveyor means, for translating said individual bodies, movable along a second axis at a small acute angle to said first axis
    means for measuring and supplying edible particulate material onto said individual bodies, and
    means for reducing the temperature of said individual bodies to below 0° Fahrenheit.

7. The apparatus of claim 6 wherein said means for measuring and supplying edible particulate material includes an open ended channel means for receiving said particulate material and means for vibrating said channel means.

8. The apparatus of claim 6 wherein said chambers are reciprocated in one direction at a first speed and in the opposite direction at a second speed distinct from said first speed.

9. The apparatus of claim 1 wherein said first means for horizontally reciprocating said nozzle means translates said nozzle means at a first speed in one direction and a second, distinct speed in the opposite direction.

10. The apparatus of claim 1 wherein said first means for vertically reciprocating said nozzle means translates said nozzle means at a first speed in one direction and a second, distinct speed in the opposite direction.

11. The apparatus of claim 5 wherein said chambers have a substantially constant cross section.

12. The apparatus of claim 1 wherein said
    means for reciprocating said nozzle means includes a first means for horizontally reciprocating said nozzle means and second means for vertically reciprocating said nozzle means, said first and said second means operating in phased relationship to reciprocate said nozzle means.

13. The apparatus of claim 6 wherein said means for reciprocating said chamber means includes a first means for horizontally reciprocating said chamber means and second means for vertically reciprocating said chamber means, said first and said second means operating in phased relationship to reciprocate said chamber means.

* * * * *

UNITED STATES PATENT AND TRADEMARK OFFICE
CERTIFICATE OF CORRECTION

PATENT NO. : 4,752,197

DATED : June 21, 1988

INVENTOR(S) : Harlan R. Getman

It is certified that error appears in the above-identified patent and that said Letters Patent is hereby corrected as shown below:

Column 12, line 2, "defining having a" should read -- defining a --.

Signed and Sealed this

Twentieth Day of December, 1988

*Attest:*

DONALD J. QUIGG

*Attesting Officer*     *Commissioner of Patents and Trademarks*